United States Patent
Kato et al.

[11] Patent Number: 6,087,067
[45] Date of Patent: Jul. 11, 2000

[54] OPTICAL RECORDING MEDIUM

[75] Inventors: Tatsuya Kato; Hajime Utsunomiya; Tsuyoshi Komaki; Hideki Hirata, all of Nagano, Japan

[73] Assignee: TDK Corporation, Tokyo, Japan

[21] Appl. No.: 09/055,873

[22] Filed: Apr. 7, 1998

[30] Foreign Application Priority Data

Apr. 10, 1997 [JP] Japan .................................. 9-108088

[51] Int. Cl.$^7$ ..................................................... G11B 7/24
[52] U.S. Cl. ................ 430/270.13; 430/945; 369/275.2; 428/64.5; 428/64.8
[58] Field of Search .............................. 430/270.13, 945; 369/275.2; 428/64.5, 64.8

[56] References Cited

U.S. PATENT DOCUMENTS

| | | | |
|---|---|---|---|
| 5,298,305 | 3/1994 | Shinozuka et al. | 430/270.13 |
| 5,418,030 | 5/1995 | Tominaga et al. | 430/270.13 |
| 5,652,036 | 7/1997 | Kobayashi et al. | 430/270.13 |
| 5,882,758 | 3/1999 | Terada et al. | 430/270.13 |

FOREIGN PATENT DOCUMENTS

| | | |
|---|---|---|
| 60-164938 | 8/1985 | Japan . |
| 61-099951 | 5/1986 | Japan . |
| 6-30168 | 6/1986 | Japan . |
| 63-037995 | 2/1988 | Japan . |
| 3-187034 | 8/1991 | Japan . |
| 5-298747 | 11/1993 | Japan . |
| 7-161071 | 6/1995 | Japan . |
| 8-124218 | 5/1996 | Japan . |

*Primary Examiner*—Martin Angebrandt
*Attorney, Agent, or Firm*—Laubscher & Laubscher; R. J. Lasker

[57] ABSTRACT

An optical recording medium of phase change type, and in particular, a dual side medium prepared by adhering two single side media is provided. In this medium, deformation of record marks generated in the overwriting due to difference in light absorption between the record marks and the region other than the record marks is prevented by providing a reflective layer of high light transmission, and increase in jitter and failure of track servo and focus servo caused by uneven coating of the adhesive layer and the resin protective layer are prevented. The optical recording medium comprises a substrate, a recording layer of phase change type on the surface side of the substrate, and a reflective layer and a light absorption layer disposed in this order on the surface side of the recording layer. The light absorption layer has a light transmission of 85% or higher in wavelength range S (wavelength in the range of 400 to 450 nm), up to 55% at the recording/reproducing wavelength, and 80% or higher in wavelength range L (wavelength in the range of 800 to 830 nm).

4 Claims, 3 Drawing Sheets

OPTICAL RECORDING MEDIUM

BACKGROUND OF THE INVENTION

1. Field of the Invention

This invention relates to an optical recording medium of phase change type.

2. Prior Art

Highlight is recently focused on optical recording media capable of recording information at a high density and erasing the recorded information for overwriting. One typical rewritable (or erasable) optical recording medium is of the phase change type wherein a laser beam is directed to the recording layer to change its crystallographic state whereupon a change of reflectivity by the crystallographic change is detected for reproduction of the information. Optical recording media of the phase change type are of great interest since they can be overwritten by modulating the intensity of a single light beam and the optical system of the drive unit used for their operation is simple as compared with magneto-optical recording media.

The optical recording medium of phase change type utilizes difference in reflectivity between the crystalline and the noncrystalline state, and light absorption (Ac) of the recording layer in the region other than recording marks (in crystalline state) and the light absorption (Aa) of the recording layer in the recording marks (in noncrystalline state) are often different, and the Ac<Aa is the condition generally found in such situation. Recording sensitivity and eraseability are thus different depending on whether the region overwritten is crystalline or noncrystalline, and consequently, the record marks of different length and width are formed by the overwriting to invite increase in the jitter often resulting in errors. When mark edge recording wherein the information is encoded in opposite edges of the record marks is adopted for increasing the recording density, variation in the length of the record marks has greater significance and such variation invites increased errors. In order to solve such a situation, the absorption should be adjusted to Ac=Aa, or Ac>Aa in consideration of the latent heat, by regulating the thickness of the recording layer or the dielectric layers sandwiching the recording layer. In the medium of conventional structure, the adjustment to Ac≧Aa results in reduced difference between the reflectivity (Rc) of the medium of the region other than the record marks and the reflectivity (Ra) of the medium in the record marks, and hence, in a reduced C/N.

In view of such situation, Japanese Patent Application Laid-Open No. 5(1993)-298747 proposes provision of a thin reflective layer of not more than 15 nm comprising Au or an alloy thereof on the recording layer with the intervening dielectric layer, and discloses ΔA (=Ac−Aa) of 5% or higher, and ΔR (=Rc−Ra) of 15% or higher.

Japanese Patent Application Laid-Open No. 8(1996)-124218 proposes an optical information recording medium comprising a substrate, a first dielectric layer, a recording layer, a second dielectric layer, a reflective layer, a third dielectric layer, and a UV curing resin layer disposed in this order wherein Ac>Aa, and an extremely thin metal film of high light transmission, Si or Ge is used for the reflective layer, and a dielectric material having a refractive index of higher than 1.5 is used for the third dielectric layer. Increase in Ac/Aa is achieved without detracting from the high (Rc−Ra) by providing the reflective layer of high light transmission and the third dielectric layer of high refractive index.

Provision of the reflective layer of high light transmission as described in the above-cited the patent publications is associated with the problems as described below. When a dual side optical recording medium is prepared by bonding two substrates each having a recording layer disposed thereon by means of an intervening adhesive layer, the adhesive layer deposited by roll coating, screen coating, or the like is associated with unevenness or mark in the coating direction, and such unevenness is converted by the optical pickup into noise, inviting increase of jitter and failure in track servo and focus servo. In the case of a single substrate optical recording medium, a resin protective layer is provided as a top coat on the side of the recording layer, and when the resin protective layer is formed by such process as spin coating, the noise caused by the uneven coating is the trouble.

SUMMARY OF THE INVENTION

An object of the present invention is to provide an optical recording medium of phase change type, and in particular, a dual side optical recording medium of phase change type prepared by adhering two single side optical recording media to one another, wherein deformation of the record marks generated in overwriting due to the difference in light absorption between the record marks and the region other than the record marks is prevented by providing a reflective layer of high light transmission, and wherein increase of jitter and failure of track servo and focus servo caused by the uneven coating of the adhesive layer or the resin protective layer are prevented.

Such an object is realized by any of (1) to (3) as described below.

(1) An optical recording medium comprising a substrate, a recording layer of phase change type on the surface side of the substrate, and a reflective layer and a light absorption layer disposed in this order on the surface side of the recording layer, wherein said light absorption layer has a light transmission of 85% or higher in wavelength range S (wavelength in the range of 400 to 450 nm), up to 55% at the recording/reproducing wavelength, and 80% or higher in wavelength range L (wavelength in the range of 800 to 830 nm).

(2) The optical recording medium according to the above (1) wherein a transparent resin layer is disposed on the substrate side of said light absorption layer in contact with said light absorption layer.

(3) The optical recording medium prepared by adhering two optical recording media of the above (1) or (2) by means of an intervening adhesive layer such that said light absorption layer is on the interior side of the medium.

BRIEF DESCRIPTION OF THE DRAWINGS

These and further features of the present invention will be apparent with reference to the following description and drawings, wherein.

DETAILED DESCRIPTION OF THE INVENTION

Figure 1:
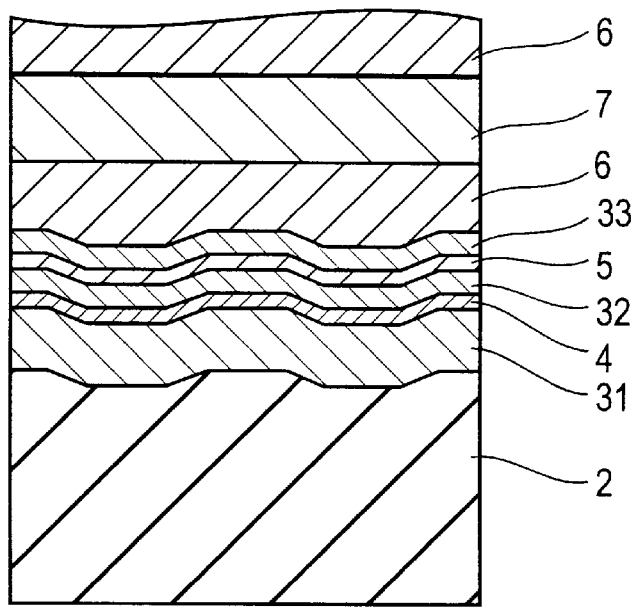
FIG. 1 is a schematic partial cross-sectional view of the optical recording medium according to an embodiment of the present invention.
Figure 2:
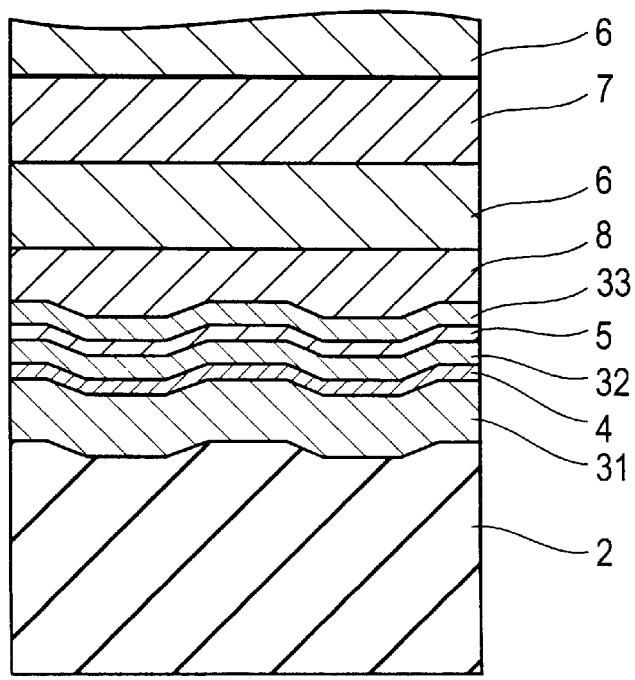
FIG. 2 is a schematic partial cross-sectional view of the optical recording medium according to another embodiment of the present invention.
Figure 3:
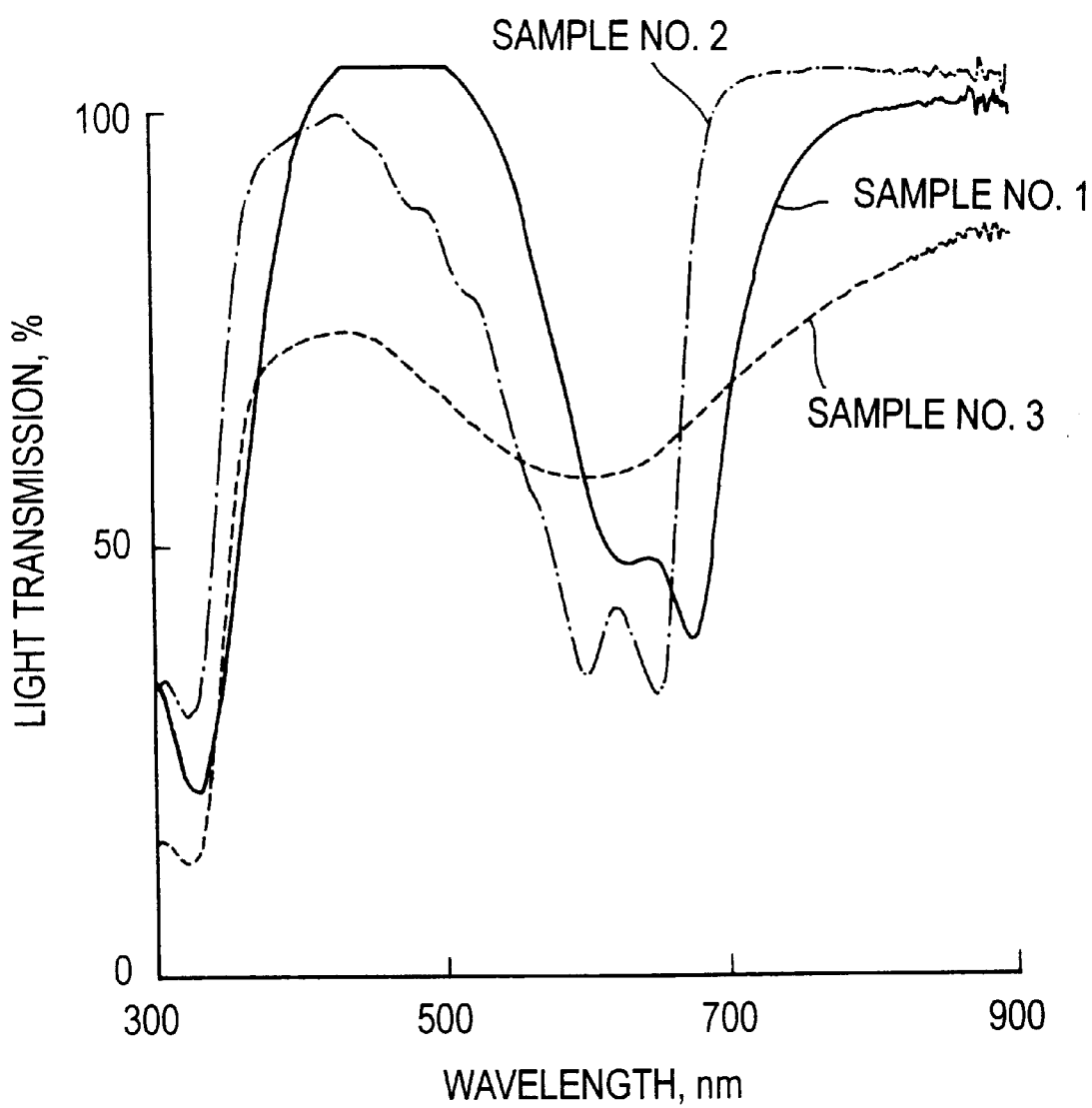
FIG. 3 is a graph showing transmission spectrum of the light absorption layer.

In the present invention, in the optical recording medium of phase change type as shown in FIGS. 1 and 2 wherein a recording layer 4 is disposed on the surface side of a substrate 2 and the reproducing light is delivered from the back side of the substrate 2, a reflective layer 5 of high light transmission is disposed on the surface side of the recording layer 4 in order to prevent deformation of the record marks in the overwriting caused by the difference in light absorption between the region other than the record marks (crystalline) and the record marks (noncrystalline). In the present invention, on the surface side of the reflective layer 5 is further disposed a light absorption layer 6 which exhibits specific light transmission in each of the short wavelength range (wavelength range S), the recording/reproducing wavelength, and the long wavelength range (wavelength range L).

The wavelength range S corresponds to the wavelength range of the light used for curing the UV curing resin, and the light absorption layer exhibits higher light transmission above a certain value for the light in this wavelength enabling sufficient curing of the absorption layer containing the UV curing resin.

The light absorption layer exhibits a light transmission below a certain value for the light of the recording/reproducing wavelength, and in the recording/reproducing, a reduced amount of the light is reflected from the resin protective layer back to the direction of the substrate, and in the case of a dual side optical recording medium, from the adhesive layer formed on the surface side of the light absorption layer. As a consequence, the amount of the light irregularly reflected by the uneven coating of the adhesive layer in the coating direction is reduced, and the thus produced medium exhibits reduced jitter and error as well as no failure in track servo and focus servo.

The wavelength range L corresponds to the wavelength range of the bulk eraser used for initialization. A bulk eraser is an apparatus capable of irradiating the medium with a high power gas laser or semiconductor laser without tight focusing of the beam to crystallize many tracks at once. The bulk eraser, therefore, is a means most suitable for the initialization of a phase change type optical recording medium in an industrial scale. In addition, the bulk eraser is capable of conducting a localized heating of the recording layer, and temperature elevation of the substrate is thus reduced to enable use of a resin substrate of low heat resistance. The light absorption layer of the present invention exhibits higher light transmission above a certain value for the light in wavelength range L, and this in turn means reduced absorption of the high power laser beam from the bulk eraser. Heat generation of the light absorption layer in the initialization is thereby suppressed, and the adverse effects of the heat such as increase in jitter and deformation of the substrate are avoided.

When the light transmission in wavelength range L is within the range of the present invention, but somewhat low, the heat generated in the light absorption layer by the bulk eraser may adversely affect the dielectric layer or the recording layer. In such a case, a transparent resin layer may be disposed on the substrate side of the light absorption layer in contact with the light absorption layer to thereby reduce the heat conducted from the light absorption layer to the dielectric layer and the recording layer.

Not only the dual side recording medium comprising two bonded substrates each having the recording layer thereon as shown in FIGS. 1 and 2, but also a single side recording medium wherein one substrate has no recording layer disposed thereon may be used in the present invention, and in such case, the merit of the present invention, that is, the prevention of the adverse effects of the uneven coating is similarly realized. The present invention is also applicable for the single substrate medium which is not the dual substrate medium prepared by adhering two single substrate media. The increase in jitter caused by the irregular reflection from the unevenly coated resin protective layer as found in conventional single substrate medium is reduced in the present invention by replacing the resin protective layer with the light absorption layer.

It should be noted that the provision of the light absorption layer is already proposed in the publications as described below.

Japanese Patent Publication 5(1993)-44741 describes formation of a light absorption layer by incorporating a colorant in the UV curing resin, and there is described that the optical recording element obtained exhibits low noise level and high durability. In Example 1 of this publication, a dual side recording optical recording element is prepared by adding aniline black to a lacquer coating composition containing nitrocellulose as its main ingredient; forming a light absorption layer by spin coating the coating composition having a solvent added thereto by a spinner to produce an optical recording element; and adhering the optical recording element with another likewise produced optical recording element by means of a tacky hot melt adhesive which has been coated with a roll coater to produce the dual side recording element. In this publication, there is described that it is important for the colorant to absorb the light of the readout wavelength, and black colorants such as carbon black, iron black, graphite, and aniline black are described as exemplary colorants. There is also described that blue colorants such as phthalocyanine blue, cobalt blue, and ultramarine in addition to the black colorants can also be effectively used when He-Ne or Ar laser is used for the readout light.

Of the colorants mentioned in this publication, the black colorants do not meet the light transmission limitation of the present invention. The black colorants mentioned exhibit broad absorption spectrum with no substantial peak, and when the light transmission of the light absorption layer at the recording/reproducing wavelength is reduced to the required level, the transmission in wavelength range S is simultaneously reduced to an unacceptable level such that the light absorption layer formed by combining the colorant with the UV curing resin will suffer from insufficient curing. The light transmission in wavelength range L will also be reduced to an excessively low level, and the light absorption layer will suffer from heat generation upon initialization by the bulk eraser, and the medium will suffer from such troubles as deformation of the resin substrate.

The transmission spectra of the blue colorants such as phthalocyanine blue used in this publication are not disclosed, and it is unknown whether the light transmission of the blue colorants used in wavelength range S, the recording/reproducing wavelength, and wavelength range L meets the limitation of the present invention. Phthalocyanine blue is one of the dyes which are preferably used in the present invention. The wavelength of the absorption peak of the phthalocyanine blue, however, shifts by the substituent introduced in the molecule, and the merits of the present invention are not realized by merely utilizing the phthalocyanine blue for the dye. Cobalt blue ($CoO \cdot nAl_2O_3$) and ultramarine ($Na_6Al_6(SiO_4)_6 \cdot 2Na_3SO_4$) are insoluble in the resin, and use of such colorants are unfavorable. This publication is also silent about the provision of the reflective layer.

This publication also discloses provision of a light-transmissive surface-separating layer between the light absorption layer and the recording layer. The surface-separating layer, however, is formed for the purpose of alleviating the adverse effects of the irregular reflection caused by the incorporation in the light absorption layer of the particulate colorant such as a pigment, and therefore, this layer functions differently from the transparent resin layer of the present invention.

Japanese Patent Publication 3(1991)-79770 proposes an optical recording element comprising two information recording media adhered to one another by an intervening adhesive layer wherein an opaque dye or pigment is incorporated in the adhesive layer. In this publication, an opaque adhesive layer is employed for the purpose of preventing reduction of S/N and C/N by the irregularly reflected light due to the surface conditions of the recording medium (for example, bubbles and uneven coating on the surface in contact with the adhesive layer), and this purpose is similar to that of the present invention. The opaque pigment and dye disclosed in this publication, however, are the black pigment and dye such as carbon black and aniline black which exhibit broad transmission spectrum as describe above, and the merits of the present invention are never realized by using such colorants. The invention of this publication is different from the present invention also in that an opaque adhesive layer is used instead of providing the light absorption layer, and as a consequence, the adverse effects of the uneven coating of the adhesive layer is alleviated to a degree less than the present invention. This publication is also silent for the provision of the reflective layer.

BEST MODE FOR CARRYING OUT THE INVENTION

Typical embodiments of the optical recording medium according to the present invention are shown in FIGS. 1 and 2. The optical recording medium shown in FIG. 1 is a dual side optical recording medium comprising two single side optical recording media each having a first dielectric layer 31, a recording layer 4, a second dielectric layer 32, a reflective layer 5, a third dielectric layer 33, and a light absorption layer 6 disposed on a substrate 2 in this order. The single side optical recording media are adhered to each other by an intervening adhesive layer 7 such that the light absorption layer 6 is located in the interior side of the resulting medium. The optical recording medium shown in FIG. 2 is of the constitution the same as the optical recording medium of FIG. 1 except that a transparent layer 8 is formed between the third dielectric layer 33 and the light absorption layer 6.

The optical recording medium in accordance with the present invention is described in further detail by referring to each layer constituting the medium.

Light absorption layer 6

The light absorption layer 6 has a light transmission of 85% or higher and preferably 90% or higher in the wavelength range S (wavelength range of 400 to 450 nm), up to 55% and preferably up to 50% at the recording/reproducing wavelength, and 80% or higher and preferably 90% or higher in the wavelength range L (wavelength range of 800 to 830 nm).

The light transmission of the light absorption layer of the present invention is the value determined as described below. First, a test sample for transmission measurement is prepared by depositing only the light absorption layer on the substrate used for the production of the optical recording medium under the conditions used for the production of the medium, and the test sample is measured for its transmission spectrum. The substrate with no overlying layer is also measured for its transmission spectrum. By using the thus obtained measurements, transmission spectrum solely for the light absorption layer is calculated by excluding the influence of the polycarbonate substrate, and the light transmission at the wavelength range S, the recording/reproducing wavelength, and the wavelength range L is determined. It should be noted that the provision of the light absorption layer on the substrate may result in the enhanced light transmission, and the light transmission in the particular wavelength range of the test sample may exceed the light transmission of the substrate alone. In such a case, the light transmission of the light absorption layer calculated by the method as described above will exceed 100%.

The wavelength range S includes major wavelengths of the lights emitted from a metal halide lamp or a high pressure mercury lamp (about 360 to 450 nm) within its range, and therefore, an excessively low light transmission in the wavelength range S invites an insufficient curing of the light absorption layer and production of the optical recording medium would be impossible.

When the light absorption layer has an excessively high light transmission at the recording/reproducing wavelength, irregular reflection caused by the inconsistent coating of the adhesive layer will not be sufficiently regulated by the light absorption layer, and the increased jitter may adversely affect the track servo and the focus servo.

The wavelength range L corresponds to the wavelength range of the bulk eraser. An excessively low light transmission will result in an increased absorption of the high power laser beam emitted from the bulk eraser, and the heat generated will invite deformation of the resin substrate.

The light absorption layer 6 also functions as a resin protective layer which had been provided in conventional media for the purpose of improving the resistance to abrasion and corrosion.

The light absorption layer is prepared by curing a UV curing composition comprising a UV curing resin and a colorant added for the purpose of realizing the transmission profile as described above.

A dye is used for the colorant. When a pigment is used for the colorant, the surface of the light absorption layer in contact with the substrate will have an increased surface roughness due to the pigment particles, and the reproducing light will be irregularly reflected on this surface to invite an increased jitter.

The dye used for the light absorption layer is not limited to any particular type, and the dye may be adequately selected by taking such factor as the compatibility with the UV curing resin in the coating of the UV curing composition. The dye, however, is preferably a phthalocyanine dye such as an oil-soluble dye comprising copper phthalocyanine having introduced therein a substituent such as an aliphatic chain. The substituent introduced in the copper phthalocyanine may be adequately selected in consideration of the transmission profile, the compatibility, and the like.

Preferably, the dye used in the present invention is the one having the light adsorption peak which is the highest in the range of from the lower limit of the wavelength range S to the upper limit of the wavelength range L at a wavelength within the range of the recording/reproducing wavelength ±15 nm when the dye is in the form of a solution.

The UV curing resin comprises a UV curing component and a photopolymerization initiator. The UV curing component of the light absorption layer is not particularly limited, and an adequate component may be selected by taking such factor as compatibility with the dye in the coating into consideration. For example, a conventional UV curing component such as an oligoester acrylate may be used with a photoinitiator as described below for the adhesive layer.

The thickness of the light absorption layer may be adequately determined to realize the transmission profile as described above and to enable the light absorption layer to functions as a protective layer. The light absorption layer, however, is generally deposited to a thickness of 1 to 100 μm, and preferably to a thickness of 3 to 50 μm. When the light absorption layer is too thin, the content of the colorant in the light absorption layer must be increased to achieve the sufficient light absorption at the recording/reproducing wavelength, and such increased content of the colorant results in an increased amount of the colorant remaining undissolved in the resin, and hence, inconsistent coating and poor adhesion. An excessively thin light absorption layer also result in an insufficient function as a protective layer. On the other hand, an excessively thick light absorption layer results in poor adhesion and increased warp of the medium.

The ratio of the colorant to the resin in the light absorption layer is not particularly limited, and the colorant/resin ratio may be adequately determined so that the light absorption layer will exhibit the transmission profile as described above at the particular preferable thickness of the light absorption layer. The colorant is typically used at about 0.1 to 5 wt % of the resin.

The light absorption layer 6 may be formed by any of the conventional techniques such as spin coating, gravure coating, spray coating, and dipping, and preferably, by spin coating.

Transparent resin layer 8

In the initialization, light absorption layer 6 absorbs the high power laser beam from the bulk eraser to some extent and some heat is generated. By providing the transparent resin layer 8 on the substrate side of the light absorption layer 6 in contact with the light absorption layer 6, heat transmission from the light absorption layer to the dielectric layers and the recording layer can be reduced. The transparent resin layer is thus provided by taking the light transmission of the light absorption layer in the bulk eraser wavelength and the power of the bulk eraser into consideration.

The transparent resin layer may be formed from any material, and the resin used may be the one exhibiting a sufficiently high light transmission in the bulk eraser wavelength, and preferably, a resin exhibiting a light transmission of 85% or higher in the wavelength range L. To be specific, the transparent resin layer is preferably formed from a UV curing resin, and the UV curing resin may be selected from those described for the light absorption layer.

The transparent resin layer may have a thickness adequately determined to sufficiently shut off the heat. The thickness of the transparent resin layer, however, is generally in the range of 1 to 100 μm, and preferably, 3 to 50 μm. An excessively thin transparent resin layer will result in an insufficient thermal insulation, and an excessively thick transparent resin layer will result in increased warp and inferior adhesion.

Adhesive layer 7

The adhesive used for the adhesive layer 7 is not limited to any particular type, and the adhesive may be a hot melt adhesives, a UV curing adhesive, or a room temperature curing adhesive, or alternatively, a pressure sensitive adhesive.

The hot melt adhesive contains a base polymer which is not limited to any particular type as long as it is tacky at room temperature, and preferably, the base polymer is a thermoplastic block copolymer elastomer. Exemplary block components of the thermoplastic block copolymer elastomer include polystyrene, polybutadiene, polyisoprene, ethylene-butyrene copolymer, which may be used alone or in combination of two or more. The most preferred is a block copolymer elastomer of a polystyrene having a molecular weight of about 2000 to 12500 and a polybutadiene, polyisoprene or ethylene-butyrene copolymer having a molecular weight of about 1000 to 250,000. The molecular weight of the block copolymer elastomer is preferably in the range of about 3000 to 500,000. The base polymer may preferably contain one or more optional component which may be a synthetic rubber such as isoprene rubber, styrene rubber, butadiene rubber, or butyl rubber; or a polyolefin or a copolymer thereof such as polyethylene, polypropylene, or ethylene-vinyl acetate copolymer.

It should be noted that the hot melt adhesive containing the UV curing component as described below in relation to the UV curing adhesive may be used as a hot melt adhesive, or alternatively, by polymerization with UV or electron irradiation.

The UV curing adhesive contains at least a UV curing component and a photoinitiator. The UV curing component is preferably an oligomer of a saturated hydrocarbon resin which contains at least one acryloyl group having a double bond reactive to UV or electron ray in one molecule. Exemplary such oligomers include acrylate, urethane acrylate, epoxy acrylate and ester acrylate of a saturated hydrocarbon resin oligomer containing at least one hydroxyl group or carboxyl group per one molecule such as hydrogenated polybutadiene, polybutene, hydrogenated polyisoprene and polyisobutylene. Such oligomer may be used alone or in combination of two or more. To reduce Young's modulus at room temperature of the adhesive layer after the curing, an acrylate monomer or an acrylate oligomer containing a long chain molecule such as a long chain alkyl or polyol may be used for the UV curing component, and such component may be used at a high content. Exemplary long chain molecules include caprolactone modified 2-hydroxyethyl acrylate, polyethylene glycol diacrylate (PEG), isodecyl acrylate, and isooctyl acrylate. Young's modulus at room temperature can also be reduced by using a UV curing component mainly comprising a urethane acrylate oligomer having polyol structure. The photoinitiator used may be any conventional photoinitiator which generates a radical by UV or electron irradiation. Exemplary photoinitiators include benzoin ether photoinitiators such as benzoin isopropylether and benzoin isobuthylether; benzophenone photoinitiators such as benzophenone, p-methoxybenzophenone, and p-bromobenzophenone; acetophenone photoinitiators such as benzylmethylketal, 2,2-diethoxyacetophenone, and 1,1-dichloroacetophenone; thioxanthone photoinitiators such as 2-chlorothioxanthone; quinone photoinitiators such as anthoraquinone and phenanthoraquinone; and sulfide photoinitiators such as benzylsulphide, and tetramethylsulfide.

The pressure sensitive adhesives may preferably be the one comprising an acrylic base polymer having added thereto a tackifier as described below, a softener, a filler, an anti-aging agent, a crosslinking agent, and the like.

The hot melt adhesive and the pressure sensitive adhesive may preferably contain a tackifier. Exemplary tackifiers are rosin resin, coumarone resin, hydrogenated petroleum resin, hydrogenated terpene resin, and phenol resin which may be used alone or in combination of two or more. The hydrogenated tackifiers exhibit good compatibility with no adverse effects on thermal stability, and also, low water absorption with little influence on corrosion resistance.

Exemplary softeners are process oil, paraffin oil, polybutene, and polyisobutylene which may be used alone or in combination of two or more. The adhesive may also contain optional additives such as plasticizer, wax, UV absorber, filler, and anti-aging agent.

The room temperature curing adhesive may be a silicone rubber adhesive, a two part adhesive, a contact curing adhesive, or the like. The most preferable among these is the silicone rubber adhesive.

The adhesive may be coated by using a roll coater or the like. The adhesive may be applied either on one substrate, or on both substrates. The adhesive may be cured after the application if such curing is desirable. It is also possible to adhere the substrates together after applying a pressure sensitive adhesive in the form of a sheet on one of the substrates.

The adhesive layer may have a thickness of 10 to 100 $\mu$m, and most preferably, 40 to 80 $\mu$m. An excessively thin adhesive layer results in an insufficient adhesion while an excessively thick adhesive layer results in an insufficient durability.

Reflective layer 5

The reflective layer 5 may comprise an extremely thin layer of a metal of high light transmission or a layer of silicon or germanium having a high transmission for the light of near infrared to infrared region including the recording/reproducing wavelength. The thickness of the reflective layer may be adequately determined to enable the absorption correction between the region other than the record marks and the record marks as described above. The range of the preferable thickness of the reflective layer is significantly different by the material constituting the reflective layer, and the thickness may be determined in accordance with the material. When a metal such as Au is used for the reflective layer, the reflective layer may preferably have a thickness of up to 40 nm, and more preferably 10 to 30 nm. When Si or Ge is used for the reflective layer, the reflective layer may preferably have a thickness of up to 80 nm, and more preferably from 40 to 70 nm. A thickness below this range will invite decline of C/N, and a thickness beyond this range would provide no substantial improvement in the absorption correction effect.

When the reflective layer 5 is formed from a metal, the reflective layer may preferably comprise Au or an alloy thereof. The Au alloy may comprise the main component of Au and at least one alloying component selected from Al, Cr, Cu, Ge, Co, Ni, Mo, Ag, Pt, Pd, Ta, Ti, Bi and Sb.

The reflective layer 5 is preferably formed by vapor deposition such as sputtering and evaporation.

Dielectric layers 31, 32 and 33

The first dielectric layer 31 plays the role of preventing oxidation of the recording layer 4 and protecting the substrate by shutting off the heat which can otherwise conduct from the recording layer to the substrate upon recording. The second dielectric layer 32 plays the role of protecting the recording layer and helps the heat remaining in the recording layer after completion of recording release through heat transfer. Further, the provision of both the dielectric layers is effective for improving a degree of modulation.

The dielectric layer used for the first and the second dielectric layer is not limited to any particular type, and various dielectric materials or a mixture thereof as well as various transparent ceramics such as silicon oxide, silicon nitride and ZnS—$SiO_2$ and various species of glass may be used. Also useful are so-called LaSiON materials containing La, Si, O, and N, so-called SiAlON materials containing Si, Al, O, and N, SiAlON containing yttrium, etc.

In the present invention, at least one of the first and the second dielectric layers may preferably contain zinc sulfide, ZnS for optimization of properties such as refractive index. The dielectric layer containing zinc sulfide is hereinafter referred to as ZnS-containing dielectric layer. The ZnS-containing dielectric layer may preferably contain an element whose standard free energy of sulfide formation is lower than the standard free energy of ZnS formation at 0 to 1000° C. (hereinafter referred to as metal element A). Incorporation of the metal element A in the ZnS-containing dielectric layer results in the suppressed release of sulfur upon repeated overwriting, and increase of jitter is thereby prevented. This results in the increased number of overwritable operations.

The metal element A is preferably at least one member selected from Ce, Ca, Mg, Sr, Ba and Na, and use of Ce is most preferable in view of the low standard free energy of sulfide formation. For example, at 300K, the standard free energy of ZnS formation is about −230 kJ/mol, the standard free energy of CeS formation is about −540 kJ/mol, the standard free energy of CaS formation is about −510 kJ/mol, the standard free energy of MgS formation is about −390 kJ/mol, the standard free energy of SrS formation is about −500 kJ/mol, the standard free energy of BaS formation is about −460 kJ/mol, and the standard free energy of $Na_2S$ formation is about −400 kJ/mol.

In the ZnS-containing dielectric layer, the ratio of the metal element A to the total metal elements is less than 2 at %, preferably 1.5 at % or less, and more preferably 1.3 at % or less. When the ratio of the metal element A is in excess of such range, the effect of suppressing jitter increase upon repeated overwriting is not realized. It should be noted that the ratio of the metal element A is preferably at least 0.01 at %, and more preferably at least 0.03 at % for sufficient realization of the metal element A addition. The ratio of the metal element A to the total metal elements may be determined by fluorescent X-ray analysis or EPMA (electron probe X-ray microanalysis). It should be noted that semimetal such as silicon is included in the "total metal elements" in the dielectric layer.

The metal element A in the dielectric layer may take form of simple substance, sulfide, oxide, fluoride, or the like.

The ZnS-containing dielectric layer may preferably contain compounds other than zinc sulfide, for example, an oxide, nitride or fluoride. Preferably, such compound is at least one member selected from silicon oxides ($SiO_2$, SiO), tantalum oxide ($Ta_2O_5$), titanium oxide ($TiO_2$), lanthanum oxide ($La_2O_3$), silicon nitride ($Si_3N_4$), aluminum nitride (AlN), magnesium fluoride ($MgF_2$), sodium fluoride (NaF) and thorium fluoride ($ThF_4$). When the dielectric layer is prepared from zinc sulfide alone, the dielectric layer is excessively hard, and heat impacts in the overwriting operations may result in delamination of the dielectric layer, leading to poor rewriting durability. Inclusion of silicon oxide, silicon nitride or the like invites improvement in the rewriting durability.

The content of the zinc sulfide in the ZnS-containing dielectric layer is preferably in the range of from 50 to 95 mol %, and more preferably from 70 to 90 mol %. When the content of the zinc sulfide is insufficient, heat conductivity will be too high and refractive index will be too low, and high C/N can not be obtained. On the other hand, an excessively high zinc sulfide content results in poor rewriting durability. The content of the zinc sulfide in the dielectric layer is calculated in terms of sulfur and zinc contents measured by fluorescent X-ray analysis or the like, and for example, when the zinc content measured is in excess of the sulfur content, the excess zinc is deemed to be present in the form of a compound other than zinc sulfide, for example, ZnO.

An embodiment wherein the metal element A is added to the ZnS-containing dielectric layer has been described in the foregoing. Alternatively, an intermediate layer containing the metal element A may be disposed between the ZnS-containing dielectric layer and the recording layer. Examples of such intermediate layer include the layer containing cerium oxide ($CeO_2$) as simple substance, and the layer containing a mixture of ZnS—$CeO_2$ mixture.

When either one of the first and the second dielectric layers is the ZnS-containing dielectric layer, the dielectric material used for the other dielectric layer, namely, the dielectric layer containing no ZnS is not limited to any particular type, and the dielectric materials as mentioned above other than the zinc sulfide or a mixture thereof may be used.

The lower and the upper dielectric layers may preferably have a refractive index of at least 1.4, especially at least 1.8 in the wavelength range of 400 to 850 nm. This wavelength range covers 780 nm which is the wavelength used in current CD players and 630–680 nm which is a candidate wavelength of the next generation recording technology and represents the range over which the optical recording medium having the recording layer as described below is advantageously operated.

The first dielectric layer 31 is preferably about 50 to 300 nm thick, more preferably 100 to 250 nm thick. Within this thickness range, the first dielectric layer is effective for preventing any damage to the substrate upon recording and higher degree of modulation is available. The second dielectric layer 32 is preferably about 10 to 30 nm, more preferably about 13 to 20 nm thick. This thickness range ensures a fast cooling rate and thus permits to define a record mark with a clear edge, resulting in reduced jitter. Also higher degree of modulation is available.

The third dielectric layer 33 optionally formed on the reflective layer 5 is preferably formed from a material which has a refractive index higher than the protective layer 6. By providing such third dielectric layer 33, the Ac/Aa as described above can be increased while maintaining the difference in reflectivity between the record marks and the region other than the record marks at a sufficient level as in the case of Japanese Patent Application Laid-Open No. 8-124218, supra.

The third dielectric layer 33 may be formed from a material selected from those described for the first and second dielectric layers. The third dielectric layer, however, is not in direct contact with the recording layer, and therefore, does not necessarily contain the metal element A as described above.

The third dielectric layer may preferably have a thickness of 30 to 120 nm, and more preferably 40 to 90 nm. An excessively thin third dielectric layer results in the decline of the signal output, and an excessively thick third dielectric layer results in the erasure of the signals in the adjacent track (cross erasure).

The dielectric layers are preferably formed by vapor deposition such as sputtering and evaporation, and the metal element A may be incorporated in the dielectric layer by various methods. For example, when the metal element A is cerium, a chip comprising cerium as simple substance or $CeO_2$ may be placed on the main target comprising the main components of the dielectric layer, or alternatively, cerium may be incorporated in the main target in the form of $CeO_2$ or other Ce compounds. When calcium or magnesium is used for the metal element A, it is possible to place a chip comprising CaO or MgO. Such oxides, however, have deliquescence, and use of such chip is undesirable. In such a case, a chip comprising $CaF_2$ or $MgF_2$ may be placed on the main target. The situation is similar when strontium, barium, sodium and the like are used for the metal element A, and use of fluoride chip is more preferable than oxide chip in view of the deliquescence. Alternatively, calcium, magnesium, strontium, barium, and sodium may be incorporated in the main target in the form of oxide or other compounds. The main target may comprise a multi-component target such as ZnS—$SiO_2$, or alternatively, ZnS and $SiO_2$ may be separately used for the main targets in simultaneous sputtering.

The ZnS-containing dielectric layer may be deposited by conventional sputtering in argon atmosphere. However, when the metal element A as described above is incorporated in the ZnS-containing dielectric layer, the sputtering is preferably effected in a mixed atmosphere of argon and oxygen. The sputtering in such mixed atmosphere enhances the effect of suppressing jitter increase upon repeated overwriting. Introduction of the oxygen into the sputtering atmosphere is particularly effective when the sputtering is conducted by placing the chip comprising the metal element A as simple substance on the main target, but such oxygen introduction is also effective when the sputtering is conducted by placing the chip comprising the compound of the metal element A on the main target or by incorporating the compound of the metal element A in the main target. The amount of oxygen introduced into the sputtering atmosphere in terms of partial pressure ratio $O_2/(Ar+O_2)$ is preferably 30% or less, and more preferably 25% or less. Excessive introduction of the oxygen is undesirable since the recording power decreases with no difference in the erasing power, and the erasing power margin would be extremely narrow. The oxygen is preferably introduced to a partial pressure ratio of 5% or higher, and more preferably, to a partial pressure ratio of 10% or higher in order to fully enjoy the effects of oxygen introduction.

Recording layer 4

The composition of the recording layer is not critical. However, the present invention is effective when the optical recording medium has a recording layer of In—Ag—Te—Sb system or Ge—Sb—Te system.

In—Ag—Te—Sb system

In the recording layer of indium (In)-silver (Ag)-tellurium (Te)-antimony (Sb) system, the atomic ratio of indium, silver, tellurium, and antimony is preferably represented by the formula (I):

$$\{(In_aAg_bTe_{1-a-b})_{1-c}Sb_c\}_{1-d}M_d \qquad (I)$$

wherein letters a, b, c and d are in the range: $0.1 \leq a \leq 0.3$, $0.1 \leq b \leq 0.3$, $0.5 \leq c \leq 0.8$, and $0 \leq d \leq 0.05$, more preferably in the range: $0.11 \leq a \leq 0.28$, $0.15 \leq b \leq 0.28$, $0.55 \leq c \leq 0.65$, and $0.005 \leq d \leq 0.05$.

If the value of a is too small in formula (I), the indium content of the recording layer will be relatively too low and record marks will become less amorphous, resulting in a lower degree of modulation and lower reliability. If the value of a is too large, the indium content of the recording layer will be relatively too high and the reflectivity of regions other than record marks will become low, resulting in a lower degree of modulation.

If the value of b is too small in formula (I), the silver content of the recording layer will be relatively too low and the recrystallization of record marks and hence, repetitive overwriting will become difficult. If the value of b is too large, the silver content of the recording layer will be relatively too high and excess silver will solely diffuse into the antimony phase during the recording and erasure. This results in lower rewriting durability, less stability of both the record marks and the crystalline regions, and a loss of reliability. Specifically, when she medium is stored at elevated temperature, record marks crystallize more to invite drops of C/N and degree of modulation. Additionally, the deterioration of C/N and degree of modulation caused by repetitive recording is promoted.

If the value of a+b is too small in formula (I), tellurium will become excessive to form a tellurium phase, which lowers the rate of crystal transition to hinder erasure. If the value of a+b is too large, it would become difficult to make the recording layer amorphous and it would become impossible to record signals.

If the value of c is too small in formula (I), change of reflectivity associated with a phase change will be sufficient, but erasure would be difficult due to markedly reduced rate of crystal transition. If the value of c is too large, change of reflectivity associated with a phase change will be insufficient to invite drop of degree of modulation.

The element M in formula II is at least one element selected from the group consisting of H, Si, C, V, W, Ta, Zn, Ti, Ce, Tb, and Y. The element M is effective for improving rewriting durability, more specifically restraining the rate of erasure from lowering as a result of repetitive rewriting. It is also effective for improving reliability under severe conditions such as hot humid conditions. At least one of V, Ta, Ce and Y is preferred among the elements M because their effects are more outstanding. V and/or Ta is more preferred, with V being the most preferred.

If the value of d which stands for the content of element M is too large, change of reflectivity associated with a phase change becomes too small to provide a sufficient degree of modulation. If the value of d is too small, effect of the addition of the element M will be insufficient.

Although it is preferred that the recording layer consists essentially of silver (Ag), antimony (Sb), tellurium (Te), indium (In), and optionally added M, it is acceptable that the silver is partially replaced by gold (Au); the antimony is partially replaced by bismuth (Bi); the tellurium (Te) is partially replaced by selenium (Se); and the indium (In) is partially replaced by aluminum (Al) and/or phosphorus (P).

The percent replacement of Ag by Au is preferably up to 50 at %, more preferably up to 20 at %. With a higher percent replacement, record marks are likely to crystallize, leading to a loss of reliability at elevated temperature.

The percent replacement of Sb by Bi is preferably up to 50 at %, more preferably up to 20 at %. With a higher percent replacement, the recording layer would have an increased coefficient of absorption. As a result, the optical interference effect and the difference in reflectivity between crystalline and amorphous regions are reduced, leading to a lower degree of modulation and a lower C/N.

The percent replacement of Te by Se is preferably up to 50 at %, more preferably up to 20 at %. With a higher percent replacement, the crystal transition would be retarded and the rate of erasure be reduced.

The percent replacement of In by Al and/or P is preferably up to 40 at %, more preferably up to 20 at %. With a higher percent replacement, record marks would become less stable with a resultant loss of reliability. The proportion of Al and P is arbitrary.

It is noted that the recording layer of this composition system after repetitive rewriting has a coefficient of absorption k of about 3.3 in the crystalline state and about 2.2 in the microcrystalline or amorphous state.

The recording layer of this composition system preferably has a thickness of about 9.5 to 50 nm, and more preferably, a thickness of about 13 to 30 nm. A too thin recording layer would restrain the growth of a crystalline phase and provide an insufficient change of reflectivity associated with a phase change. A too thick recording layer would invite silver diffusion of an increased amount in the thickness direction of the recording layer upon formation of the recording mark which in turn results in the silver diffusion of a reduced amount in the direction of the recording layer, and the resulting recording layer would be less reliable. A too thick recording layer would also provide a lower reflectivity and a lower degree of modulation.

Ge—Sb—Te system

In the recording layer of germanium (Ge)-antimony (Sb)-tellurium (Te) system, the atomic ratio of germanium, antimony and tellurium is preferably represented by the formula (II):

$$Ge_a Sb_b Te_{1-a-b} \qquad (II)$$

wherein letters a and b are in the range: $0.08 \leq a \leq 0.25$ and $0.20 \leq b \leq 0.40$.

If the value of a is too small in formula (II), record marks are more unlikely to crystallize and the rate of erasure would be lower. If the value of a is too large, much tellurium would bond with germanium with the resultant precipitation of antimony, inhibiting formation of record marks.

If the value of b is too small, the content of tellurium would be too much and record marks are more likely to crystallize when the medium is stored at elevated temperature with a loss of reliability. If the value of b is too large, antimony would precipitate to inhibit formation of record marks.

The recording layer of this composition system preferably has a thickness of about 14 to 50 nm. A too thin recording layer would restrain the growth of a crystalline phase and provide an insufficient change of reflectivity associated with a phase change. A too thick recording layer would provide a lower reflectivity and a lower degree of modulation.

The composition of the recording layer is identifiable by electron probe microanalysis (EPMA), X-ray microanalysis, ICP etc.

The recording layer is preferably formed by sputtering. The conditions for the sputtering are not critical, and when a material containing two or more elements are sputtered, the sputtering may be effected by using an alloy target or by using simultaneous sputtering employing two or more targets.

Substrate 2

Since the optical recording medium is adapted to be recorded and read by directing a light beam to the recording layer 4 through the substrate 2, the substrate 2 is preferably formed of a material substantially transparent to such a light beam, for example, resins and glass. Typical resins are acrylic resins, polycarbonate, epoxy resins and polyolefins. The shape and dimensions of the substrate are not critical although it is generally of disc shape having a diameter of about 50 to 360 mm and a thickness of about 0.5 to 3 mm. The substrate surface may be provided with a predetermined pattern of grooves for tracking and addressing purposes.

Rewriting

On the optical recording medium of the invention, the rewriting (overwriting) is performed in a manner similar to the phase change type optical recording medium of conventional type. The recording power may be applied in pulses. If one signal is recorded by at least two divided portions of irradiation, the heat accumulation in the record mark is suppressed. Then the dilation of the trailing edge of the record mark (known as a teardrop phenomenon) can be prevented, leading to an improved C/N. The pulse irradiation also improves the rate of erasure. The values of recording power and erasing power can be determined without undue experimentation. The reading laser beam should be of a low power so that the crystalline state of the recording layer may not be affected thereby.

When the optical recording medium of the invention is recorded, the linear velocity of the recording layer relative to the laser beam is generally about 0.8 to 20 m/s, preferably 1.2 to 16 m/s.

The optical recording medium of the construction as described above may be used with the recording/reproducing light selected from a wide range of wavelength. In the present invention, however, the recording/reproducing light may be selected from the wavelength in the range of 460 to 790 nm, and more preferably 470 to 780 nm.

EXAMPLES

Examples of the present invention are given below by way of illustration and not by way of limitation.

Example 1

A single side optical recording disc was prepared by injection molding polycarbonate into a disc shaped substrate 2 having a diameter of 120 mm and a thickness of 0.6 mm. A groove was formed in one major surface of the substrate simultaneous with the injection molding. The groove had a width of 0.6 µm, a depth of 65 nm, and a pitch of 1.2 µm. On the grooved surface of the substrate, there were formed a first dielectric layer 31, a recording layer 4, a second dielectric layer 32, a reflective layer 5, a third dielectric layer 33, and a light absorption layer 6. The thus produced single side optical recording disc was initialized with a bulk eraser at a wavelength of 810 nm.

The thus initialized single side optical recording disc was adhered to another single side optical recording disc which has been produced and initialized in the same way by means of the adhesive layer 7 to produce a dual side optical recording disc of the constitution as shown in FIG. 1 (Sample No. 1).

The adhesive layer 7 was formed by coating a hot melt adhesive on the surface of each of the single side optical recording disc with a roll coater.

The first dielectric layer 31 was formed by sputtering a target of ZnS (85 mol %) and SiO$_2$ (15 mol %). The first dielectric layer 31 had a thickness of 250 nm.

The recording layer 4 was formed by sputtering to a thickness of 12 nm. The recording layer 4 was of the composition:

$Ge_{0.225}Sb_{0.225}Te_{0.550}$.

The second dielectric layer 32 was formed to a thickness of 15 nm by the same procedure as the first dielectric layer 31.

The reflective layer 5 was formed to a thickness of 60 nm by sputtering a Si target.

The third dielectric layer 33 was formed to a thickness of 80 nm by the same procedure as the first dielectric layer 31.

The light absorption layer 6 was formed by preparing a coating composition comprising a mixture of a dye and a UV curing resin at a dye:resin weight ratio of 1:99, applying the coating composition by spin coating, and exposing it to a high pressure mercury vapor lamp for curing. The light absorption layer as cured had a thickness of 5 µm. The copper phthalocyanine derivative manufactured by Hodogaya Chemical Co. Ltd. was used for the dye, and SD-211 manufactured by Dainippon Ink and Chemicals Inc. was used for the UV curing resin.

For the purpose of comparison, another dual side optical recording disc (Sample No. 2) was prepared by repeating the procedure of the Sample No. 1 except that the dye was replaced with the copper phthalocyanine derivative manufactured by Nihon Kayaku Co. Ltd.

For the purpose of comparison, a single side optical recording disc (Sample No. 3) was prepared by repeating the procedure of the Sample No. 1 except that an aniline black derivative was used for the dye, and the dye and the UV curing resin were mixed at a dye:resin weight ratio of 3:97 in the formation of the light absorption layer. The light absorption layer of this disc, however, did not fully cure, and the surface of the light absorption layer remained somewhat tacky. The aniline black was also insufficient in compatibility with the UV curing resin, and the coating composition contained undissolved UV curing resin of a considerable amount, resulting in the inconsistent coating.

In order to evaluate the transmission spectrum of the light absorption layer, transmission spectrum was measured for a test sample prepared by depositing only the light absorption layer on the polycarbonate substrate under the conditions used for the formation of the light absorption layer of Sample No. 1. The polycarbonate substrate was also measured for its transmission spectrum. Transmission spectrum solely for the light absorption layer was calculated from the measurements by excluding the influence of the polycarbonate substrate. The results are shown in Table 3. The light transmission of the light absorption layer in the respective wavelength ranges was:

wavelength range S: 100%
recording/reproducing wavelength (680 nm): 40%
wavelength range L: 100%

The light absorption layer of Sample No. 2 was also evaluated for the transmission. The results are also shown in Table 3. The light transmission of the light absorption layer in the respective wavelength ranges was:

wavelength range S: 98%
recording/reproducing wavelength (680 nm): 86%
wavelength range L: in excess of 100%

The light absorption layer of Sample No. 3 was also evaluated for the transmission. The results are also shown in Table 3. The light transmission of the light absorption layer in the respective wavelength ranges was:

wavelength range S: 74%
recording/reproducing wavelength (680 nm): 64%
wavelength range L: in excess of 80%

Figure 4:
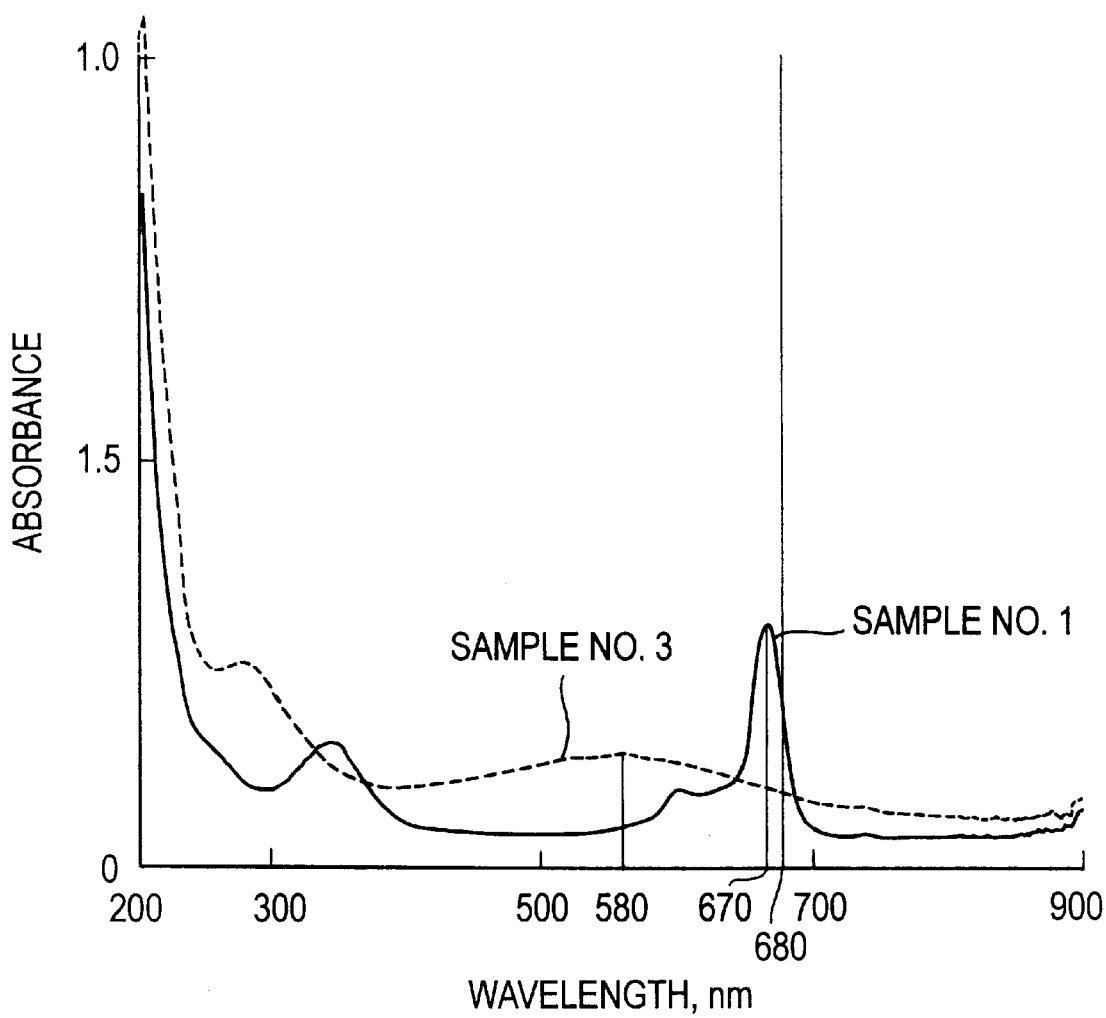
FIG. 4 is a graph showing absorbance of the die solution.

The dye used in Sample No. 1 and the aniline black derivative used in Sample No. 3 were dissolved in isopropyl alcohol, respectively, to prepare 1 wt % solutions. The solutions were measured for absorbance. The results are shown in FIG. 4. As shown in FIG. 4, the solution of the dye used in Sample No. 1 has its absorption peak at a wavelength 10 nm shorter than the recording/reproducing wavelength.

Sample Nos. 1 to 3 were placed in an evaluation system having an optical head with the wavelength of 680 nm and NA of 0.6 and the samples were recorded with (1–7) RLL recording signals at minimum bit length of 0.34 µm at a linear velocity of 12 m/s, and the reproduced signals were measured with a time interval analyzer (TIA). Jitter was calculated from the results by:

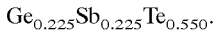

σ/Tw(%), wherein Tw represents window margin. Sample Nos. 1 to 3 were also recorded with a single frequency pulses of 3.2 mhz at a linear velocity of 12 m/s, and C/N was measured with a spectrum analyzer. The results are shown in Table 1.

TABLE 1

| Sample No. | Dye | C/N (dB) | Jitter (%) |
|---|---|---|---|
| 1 | Copper phthalocyanine derivative | 53.5 | 10 |
| 2 (Comparative) | Copper phthalocyanine derivative | 46.5 | 20 |
| 3 (Comparative) | Aniline black | 41.5 | 30 |

As demonstrated in Table 1, the jitter and the C/N are markedly improved in the sample of the present invention. It should also be noted that the samples of comparative examples exhibited an increased noise level.

Japanese Patent Application No. 9-108088 is incorporated herein by reference as well as the above-cited patent publications.

Although some preferred embodiments have been described, many modifications and variations may be made thereto in the light of the above teachings. It is therefore to be understood that within the scope of the appended claims, the invention may be practiced otherwise than as specifically described.

What is claimed is:

1. An optical recording medium comprising a substrate, a recording layer of phase change type on the surface side of the substrate, and a reflective layer and a light absorption layer in this order on the surface side of the recording layer, wherein said light absorption layer comprises a dye and a UV curing resin and has a light transmission of 85% or higher in wavelength range of 400 to 450 nm, corresponding to the wavelength range of the light for curing the UV curing resin, up to 55% light transmission at a recording/reproducing wavelength between 460 to 790 nm, and 80% or higher light transmission in the wavelength range of 800 to 830 nm, for initialization of the optical recording medium.

2. The optical recording medium according to claim 1 wherein a transparent resin layer is disposed on the substrate side of said light absorption layer in contact with said light absorption layer.

3. The optical recording medium prepared by adhering two optical recording media of claim 1 by means of an intervening adhesive layer such that said light absorption layer is on the interior side of the medium.

4. The optical recording medium prepared by adhering two optical recording media of claim 1 by means of an intervening adhesive layer such that said light absorption layer is on the interior side of the medium.

* * * * *

UNITED STATES PATENT AND TRADEMARK OFFICE
CERTIFICATE OF CORRECTION

PATENT NO. : 6,087,067
DATED : 11 July 2000
INVENTOR(S) : Tatsuya KATO et al.

It is certified that error appears in the above-identified patent and that said Letters Patent are hereby corrected as shown below:

In the claims:

Column 18, line 8, insert --the-- before "wavelength"

Column 18, line 24, delete "1" and insert --2--

Signed and Sealed this

Seventeenth Day of April, 2001

Attest:

NICHOLAS P. GODICI

Attesting Officer     Acting Director of the United States Patent and Trademark Office